(12) United States Patent
Berke et al.

(10) Patent No.: US 11,010,250 B2
(45) Date of Patent: May 18, 2021

(54) MEMORY DEVICE FAILURE RECOVERY SYSTEM

(71) Applicant: Dell Products L.P., Round Rock, TX (US)

(72) Inventors: Stuart Allen Berke, Austin, TX (US); Bhyrav M. Mutnury, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 111 days.

(21) Appl. No.: 16/510,653

(22) Filed: Jul. 12, 2019

(65) Prior Publication Data

US 2021/0011806 A1 Jan. 14, 2021

(51) Int. Cl.
*G06F 11/00* (2006.01)
*G06F 11/14* (2006.01)

(52) U.S. Cl.
CPC .... *G06F 11/1417* (2013.01); *G06F 2201/805* (2013.01); *G06F 2201/85* (2013.01)

(58) Field of Classification Search
CPC .................................................. G06F 11/1417
See application file for complete search history.

(56) References Cited

U.S. PATENT DOCUMENTS

| | | | | | |
|---|---|---|---|---|---|
| 6,230,285 | B1* | 5/2001 | Sadowsky | ........... | G06F 11/1417 714/14 |
| 6,381,694 | B1* | 4/2002 | Yen | ..................... | G06F 11/1417 713/1 |
| 8,151,135 | B2* | 4/2012 | Pratt | .................... | G06F 11/1417 714/5.1 |
| 9,639,425 | B1* | 5/2017 | Mishra | ................ | G06F 11/2284 |
| 2008/0155331 | A1* | 6/2008 | Rothman | ............ | G06F 11/1417 714/36 |
| 2010/0313069 | A1* | 12/2010 | Murata | ............... | G06F 11/0727 714/15 |
| 2011/0093741 | A1* | 4/2011 | Liang | .................. | G06F 11/1417 714/6.1 |
| 2011/0126043 | A1* | 5/2011 | Anderson | ........... | G06F 11/1433 714/6.1 |
| 2011/0264951 | A1* | 10/2011 | Pratt | .................... | G06F 11/1417 714/6.32 |
| 2016/0328300 | A1* | 11/2016 | Rahardjo | ............ | G06F 11/1469 |

(Continued)

*Primary Examiner* — Jonathan D Gibson
(74) *Attorney, Agent, or Firm* — Haynes and Boone, LLP (57) ABSTRACT

A memory device failure recovery system includes a memory device management engine that is coupled to a first memory device via a first memory device slot, and a memory device management database. The memory device management engine identifies that the first memory device has experienced a failure in a configuration region of the first memory device during a current boot operation and, in response, retrieves memory device component information and memory device configuration information that is stored in the memory device management database and that was retrieved as part of a prior boot operation from a memory device that was connected to the first memory device slot. During the current boot operation, the memory device management engine determines whether first memory device components on the first memory device correspond to the memory device component information and, if so, uses the memory device configuration information to configure the first memory device.

14 Claims, 5 Drawing Sheets

(56) References Cited

U.S. PATENT DOCUMENTS

| | | | |
|---|---|---|---|
| 2016/0378602 A1* | 12/2016 | Herzi .................... | G06F 9/4401 714/2 |
| 2019/0294490 A1* | 9/2019 | Zhang ................. | G06F 11/0793 |
| 2019/0332481 A1* | 10/2019 | Kulick ................. | G06F 11/079 |
| 2021/0011806 A1* | 1/2021 | Berke ................. | G06F 11/1417 |

* cited by examiner

MEMORY DEVICE FAILURE RECOVERY SYSTEM

BACKGROUND

The present disclosure relates generally to information handling systems, and more particularly to recovering from failures of memory devices in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, desktop computing devices, laptop/notebook computing devices, tablet computing devices, mobile phones, and/or other computing devices known in the art, include memory device that are utilized by their processing systems in order to perform a variety of computing device functionality. With the advent of persistent/storage class memory devices that may be configured to store from hundreds of gigabytes to many terabytes of data in a manner similar to storage device usage models, there is a need to improve the overall Reliability, Availability, and Serviceability (RAS) features of such memory devices. For example, Dual Inline Memory Module (DIMM) memory devices often include a Serial Presence Detect (SPD) Electronically Erasable Programmable Read Only Memory (EEPROM) device that stores DIMM memory device configuration information that enables the configuration of the DIMM memory device, and a memory cell failure in the SPD EEPROM device can make that DIMM memory device configuration information unavailable in a manner that prevents configuration of the DIMM memory device during boot (e.g., a Power On Self Test (POST)) of the computing device.

While such memory cell failures in DIMM memory devices are relatively rare, as discussed above their occurrence renders the DIMM un-configurable, and can result in the effective loss of data written to that DIMM (which can be a relatively large amount of data in the case of persistent/storage class memory devices.) Furthermore, such memory cell failures in DIMM memory devices can lead to the un-configurable DIMM being removed from the main memory capacity of the computing device, which can result in operating systems, hypervisors, and/or other computing device applications being provided less memory than is necessary for their optimal operation, and can also negatively impact memory bandwidth and memory latency if that DIMM was part of a memory (cache line) interleave group. 4, 8, and 16 rank Load-Reduced DIMM (LRDIMM) memory devices and terabyte-storage-capacity Storage Class Memory (SCM) DIMM memory devices are expected to costs in the thousands of United States Dollars (USDs) for the next several years, and thus the inability to utilize those memory devices due to the failure of the relatively inexpensive SPD EEPROM device (e.g., $1 USD) will be an unacceptable failure scenario for most users.

Accordingly, it would be desirable to provide a memory device failure recovery system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a memory device management engine that is configured to: identify, during a current boot operation, that a first memory device connected to a first memory device slot has experienced a failure in a configuration region of the first memory device; retrieve, from the memory device management database and during the current boot operation, memory device component information and memory device configuration information that was retrieved as part of a prior boot operation from a memory device that was connected to the first memory device slot; determine, during the current boot operation, whether first memory device components on the first memory device correspond to the memory device component information; and use, during the current boot operation and in response to determining that the first memory device components on the first memory device correspond to the memory device component information, the memory device configuration information to configure the first memory device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
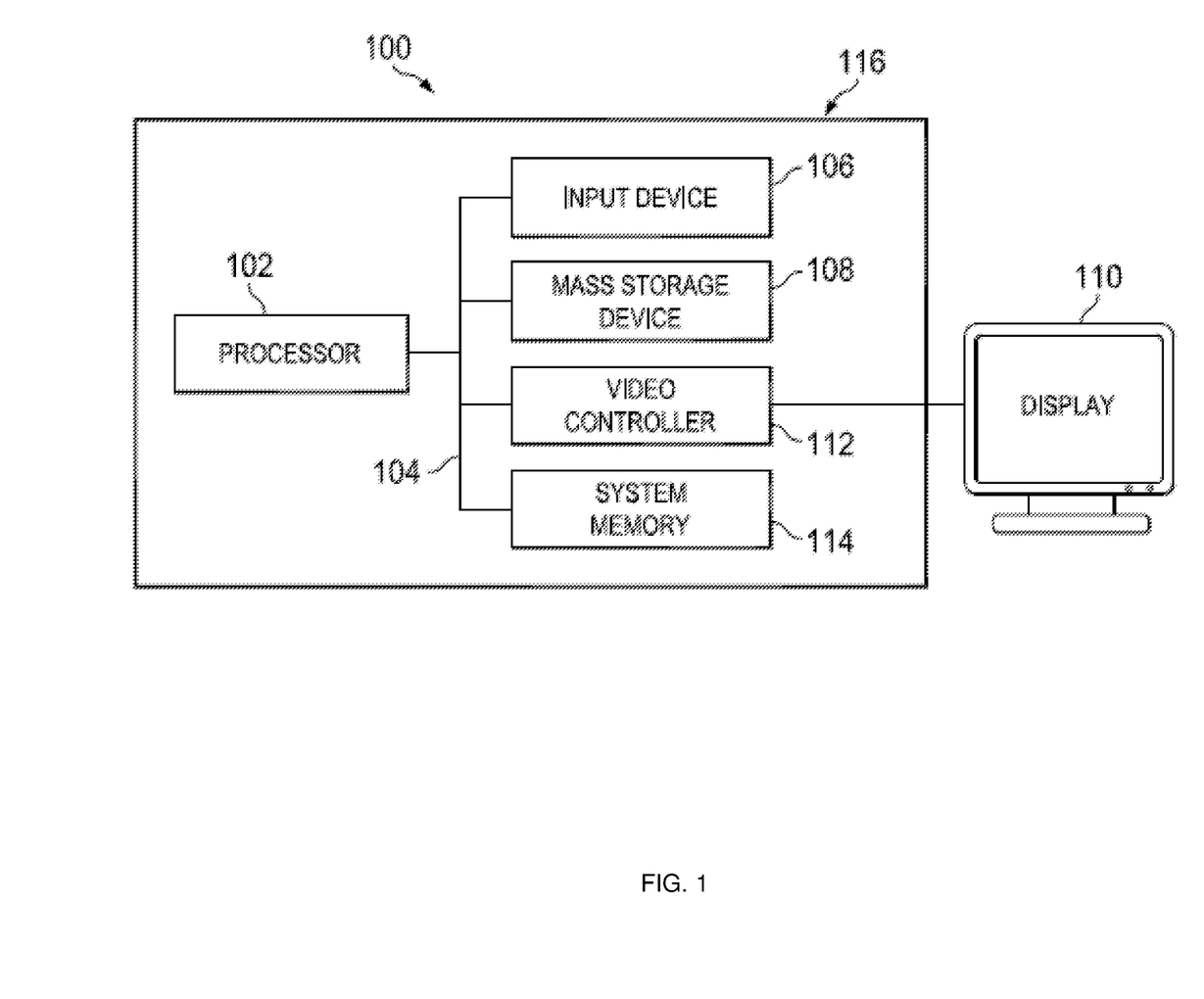
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
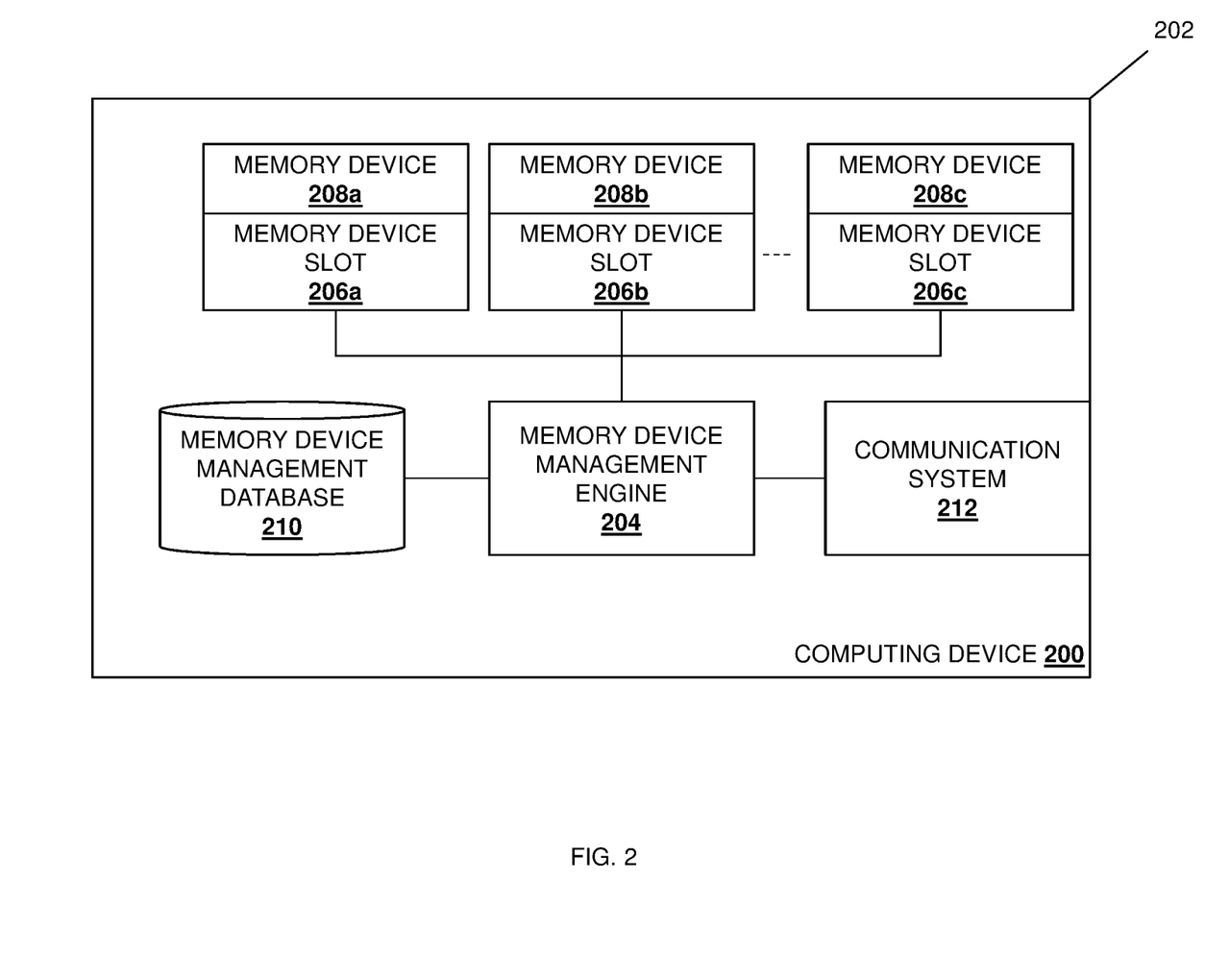
FIG. 2 is a schematic view illustrating an embodiment of a computing device that may implement the memory device failure recovery system of the present disclosure.

Referring now to FIG. 2, an embodiment of a computing device 200 is illustrated that may include the memory device failure recovery system of the present disclosure. In an embodiment, the computing device 200 may be provided by the IHS 100 discussed above with reference to FIG. 1, and/or may include some or all of the components of the IHS 100. In specific examples, the computing device 200 may be provided by a server device, a desktop computing device, a laptop/notebook computing device, a tablet computing device, a mobile phone, and/or any of a variety of other computing devices known in the art. However, one of skill in the art in possession of the present disclosure will recognize that the computing device 200 may be provided by any device may configured to utilize memory devices and operate similarly as the computing device 200 discussed below. In the illustrated embodiment, the computing device 200 includes a chassis 202 that houses the components of the computing device 200, only some of which are illustrated below. For example, the chassis 202 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a memory device management engine 204 that is configured to perform the functionality of the memory device management engines and/or computing devices discussed below.

In specific examples, the memory device management engine 204 may be provided by a memory controller, a Baseboard Management Controller (BMC) such as the integrated DELL® Remote Access Controller (iDRAC) available from DELL® Inc. of Round Rock, Tex., United States, and/or any of a variety of memory device management subsystems that would be apparent to one of skill in the art in possession of the present disclosure. In the illustrated embodiment, the memory device management engine 204 is coupled to a plurality of memory device slots 206a, 206b, and up to 206c, each of which is connected to a respective memory device 208a, 208b, and up to 208c. As will be appreciated by one of skill in the art in possession of the present disclosure, in many embodiments the memory devices 208a-208c may be part of a memory system that is separate from the memory system dedicated for the memory device management engine 204 (e.g., in order to allow the memory device management engine 204 to operate as discussed below to recover from failures of the any of the memory devices 208a-208c during a boot operation). In specific examples, the memory devices 208a-208c may be provided by Dual Inline Memory Module (DIMM) memory devices such as persistent DIMM memory devices, Storage Class Memory (SCM) DIMM memory devices, Load-Reduced DIMM (LRDIMM) memory devices, Registered DIMM (RDIMM) memory devices, Differential DIMM (DDIMM) memory devices, and/or any of a variety of other types of memory devices that would be apparent to one of skill in the art in possession of the present disclosure.

The chassis 202 may also house a storage system (not illustrated, but which may include the storage 108 discussed above with reference to FIG. 1) that is coupled to the memory device management engine 204 (e.g., via a coupling between the storage system and the processing system) and that includes a memory device management database 210 that is configured to store any of the information utilized by the memory device management engine 204 discussed below. As discussed below, at least a portion of the memory device management database 210 may be provided on a non-volatile memory subsystem in the computing device 200. The chassis 202 may also house a communication system 212 that is coupled to the memory device management engine 204 (e.g., via a coupling between the communication system 212 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. While a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3:
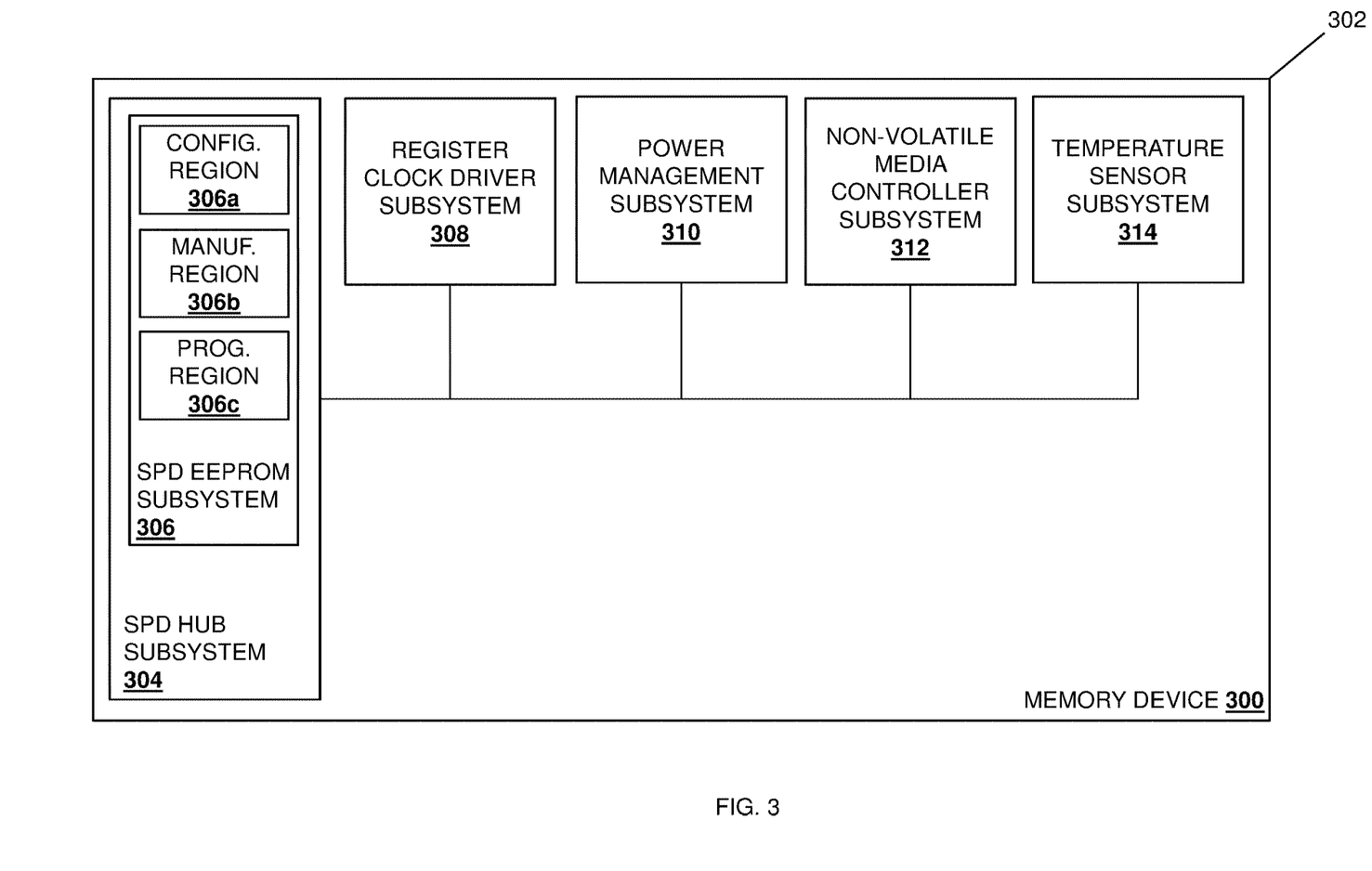
FIG. 3 is a schematic view illustrating an embodiment of a memory device that may be provided in the computing device of FIG. 2.

Referring now to FIG. 3, an embodiment of a memory device 300 is illustrated that may provide any of the memory devices 208a-208c discussed above with reference to FIG. 2. As such, the memory device 300 may be provided by DIMM memory devices such as persistent DIMM memory devices, SCM DIMM memory devices, LRDIMM memory devices, RDIMM memory devices, DDIMM memory devices, and/or any of a variety of other types of memory devices that would be apparent to one of skill in the art in possession of the present disclosure. In the illustrated embodiment, the memory device 300 includes a module 302 (e.g., a circuit board) that supports the memory device components of the memory device 300, only some of which are illustrated in FIG. 3. One of skill in the art in possession of the present disclosure will recognize that the examples below describe a memory device provided by a Dual Data Rate 5 (DDR5) DIMM memory device that includes expanded DDR5 DIMM Inter-Integrated Circuit ($I^2C$)-XM5/Improved $I^2C$ ($I^3C$) memory device components that may include any many as 8+ memory device components that operate as slave devices on the DIMM $I^3C$ interface. However, one of skill in the art in possession of the present disclosure will recognizer that a variety of other types of memory devices with other memory device components will fall within the scope of the present disclosure as well.

For example, the module 302 may support a sideband hub such as, for example, the Serial Presence Detect (SPD) hub subsystem 304 that is illustrated in FIG. 3 and that includes an SPD Electronically Erasable Programmable Read Only Memory (EEPROM) subsystem 306 having a configuration region 306a (e.g., a Base Configuration and Dynamic Random Access Memory (DRAM) Parameters and Standard Module Parameters region that utilizes the first 256 bytes of the SPD EEPROM in DDR4 DIMM memory devices, and the first 256-384 bytes in DDR5 DIMM memory devices) that may store configuration information for configuring the memory device 300, a manufacturer region 306b that may store manufacturer information about the memory device 300, and a programmable region 306c (e.g., an "end-user" programmable region) that may be programmable by an Original Equipment Manufacturer (OEM) (e.g., a server device manufacturer that manufactures the server device that provides the computing device including the memory device 300) with any of a variety of information that would be apparent to one of skill in the art in possession of the present disclosure. Furthermore, one of skill in the art in possession of the present disclosure will recognize that the size of the SPD EEPROM subsystem in DIMM memory devices has been growing with each DIMM generation, and thus larger capacity SPD EEPROM subsystem storing other information are envisioned as falling within the scope of the present disclosure as well.

As will be appreciated by one of skill in the art in possession of the present disclosure, the SPD hub subsystem 304 may also include component in addition to the SPD EEPROM subsystem 306 such as an integrated temperature sensor and/or other sideband hub components known in the art. However, while a specific SPD hub subsystem 304 and SPD EEPROM subsystem 306 have been described one of skill in the art in possession of the present disclosure will recognize that SPD hubs and SPD EEPROMs may include a variety of components and/or component configurations that will fall within the scope of the present disclosure as well.

The module 302 may also support a plurality of memory device components such as, for example, the Register Clock Driver (RCD) subsystem 308, the power management subsystem 310, the non-volatile memory controller subsystem 312, and the temperature sensor subsystem 314 illustrated in FIG. 3. As will be appreciated by one of skill in the art in possession of the present disclosure, a specific example of the memory device components on the memory device 300 may include a single RCD (provided by the RCD subsystem 308) for LRDIMM memory devices, RDIMM memory devices, and hybrid DIMM memory devices; a single power management Integrated Circuit (IC) or Voltage Regulator (VR) (provided by the power management subsystem 310) for most DIMM memory device types, or multiple (e.g., 2-3) power management ICs or VRs for DDIMM memory devices and some hybrid DIMM memory devices; a single non-volatile memory controller (provided by the non-volatile memory controller subsystem 312) for NVDIMM memory devices, hybrid DIMM memory devices, and SCM DIMM memory devices; and two remote temperature sensors (provided by the temperature sensor subsystem 314).

As will be appreciated by one of skill in the art in possession of the present disclosure, the SPD hub subsystem 304 may be coupled to each of the RCD subsystem 308, the power management subsystem 310, the non-volatile memory controller subsystem 312, and the temperature sensor subsystem 314 via an Inter-Integrated Circuit ($I^2C$) coupling that may include a Local Serial Data (LSDA) coupling and a Local Serial Clock (LSCL) couplings on the SPD hub system 304 connected to Serial Data (SDA) couplings and Serial Clock (SCL) couplings on each of the RCD subsystem 308, the power management subsystem 310, the non-volatile memory controller subsystem 312, and the temperature sensor subsystem 314. Furthermore, the SPD hub subsystem 304 may be coupled to a host (e.g., the processing system 204) via a Host Serial Data (HSDA) coupling, a Host Serial Clock (HSCL) coupling, and a Host Serial Address (HSA). However, while specific memory device components and $I^2C$ coupling configuration is illustrated and described, one of skill in the art in possession of the present disclosure will recognize that memory devices may include a variety of different memory components and/or coupling configurations that will fall within the scope of the present disclosure as well.

Figure 4A:
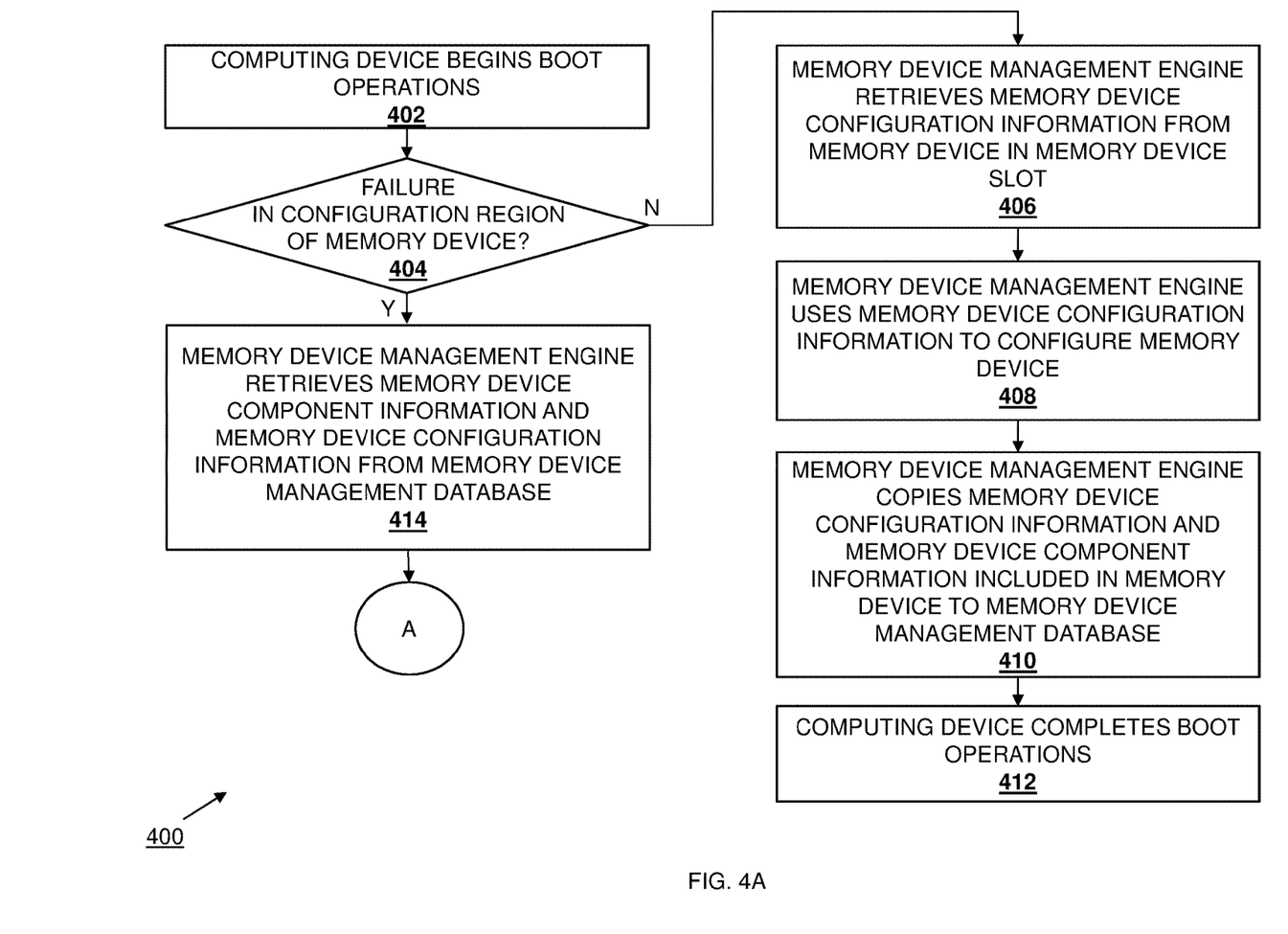
FIG. 4A is a flow chart illustrating an embodiment of a portion of a method for recovering from a failure in a memory device.
Figure 4B:
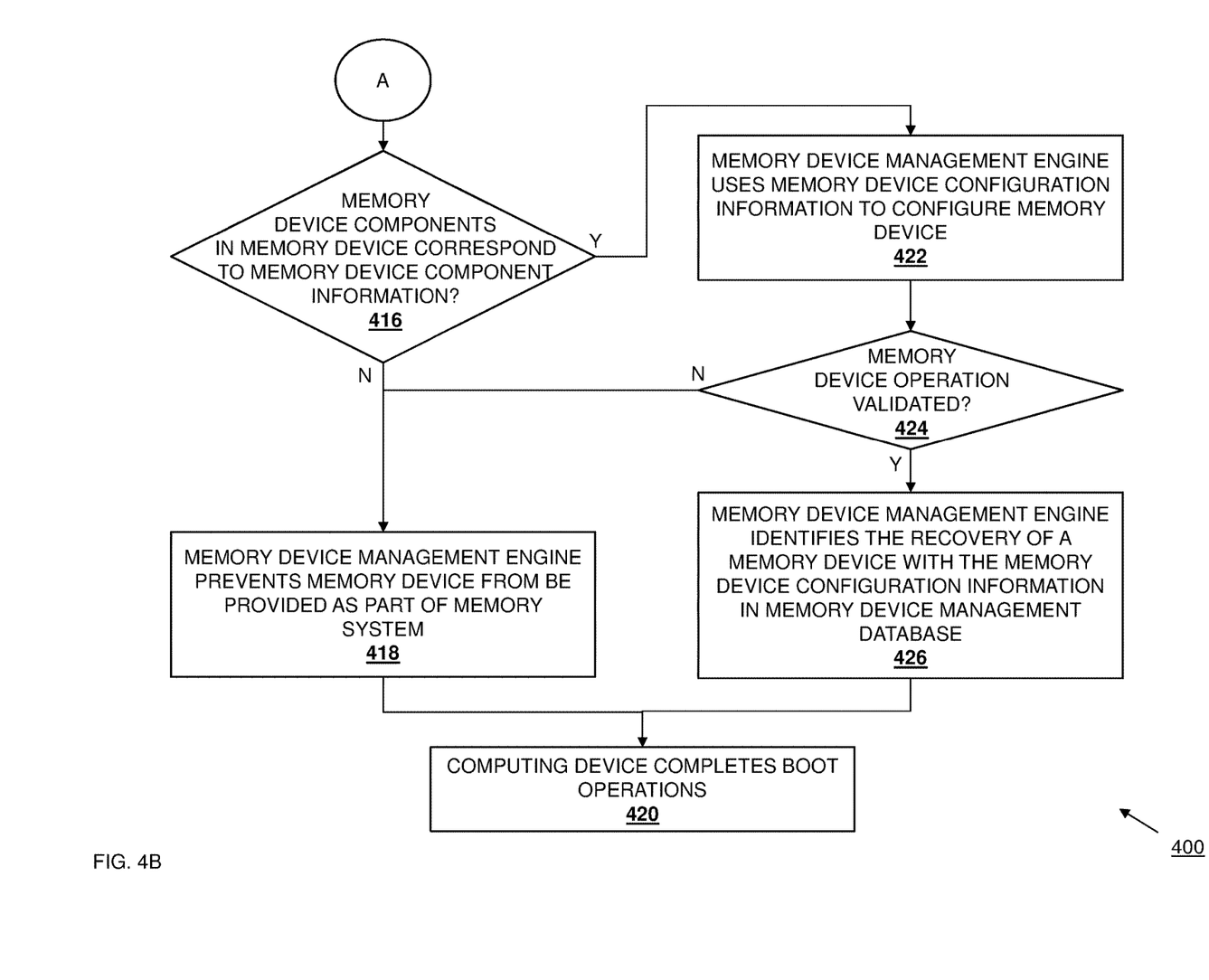
FIG. 4B is a flow chart illustrating an embodiment of a portion of a method for recovering from a failure in a memory device of FIG. 3.

Referring now to FIG. 4, an embodiment of a method 400 for recovering from a failure in a memory device is illustrated. As discussed below, the systems and methods of the present disclosure provide for recovery of memory devices that have experienced a failure in a configuration region of their SPD EEPROM subsystem that prevents configuration of those memory devices via the matching of a memory device "footprint" defined by the memory device components on that memory device with memory device configuration information that was previously retrieved from a successfully configured memory device and stored. For example, for any memory device that is connected to a memory device slot and configured during a boot operation using memory device configuration information in a configuration region of its SPD EEPROM subsystem, memory device component information that includes details about memory device components on that memory device (e.g., a "footprint" of that memory device), and that memory device configuration information, may be saved in a storage subsystem that is separate from the configuration region of their SPD EEPROM subsystem. During subsequent boot operations, in the event a memory device in one of those memory device slots experiences a failure in the configuration region of its SPD EEPROM subsystem, the memory device component information may be retrieved from that storage subsystem and used to determine whether the memory device components on that memory device correspond to memory device components described in the memory device component information (e.g., whether the "footprint" of the memory device matches that defined by the memory device configuration information). In response to determining such a correspondence, the memory device configuration information may be used to configure that memory device. As such, a memory device that is connected to a memory device slot and that would otherwise be un-configurable due to a failure in the configuration region of its SPD EEPROM subsystem may be configured by identifying a similarity between that memory device and a memory device that is associated with the most recent successful memory device configuration in that memory device slot, and performing that configuration using the memory device configuration information saved from the memory device associated with the most recent successful memory device configuration in that memory device slot.

The method 400 begins at block 402 where a computing device begins boot operations. In an embodiment, at block 402, the computing device 200 may be powered on, started up, reset, and/or otherwise initialized as part of boot operations. In a specific example, subsequent to the manufacture and installation of a motherboard that is utilized in the computing device 200 and that includes the memory device slots 206a-206c, the memory device management database 210 may include respective bits for each memory device slot 206a-206c that are set as "invalid" in order to indicate that no memory device configuration information has been copied from a memory device in that memory device slot and stored in the memory device management database 210. As such, in some examples, a "first boot operation" at block 402 may be considered specific to each memory device slot 206a-206c, and may reference the first boot operation that has been performed with a memory device connected to that memory device slot.

As such, one of skill in the art in possession of the present disclosure will recognize that some memory device slots in the computing device 200 may experience a first boot operation followed by several subsequent boot operations (i.e., because that memory device slot includes a memory device connected to it), and during that time other memory device slots in the computing device 200 may have not yet experienced a first boot operation (i.e., because no memory device has ever been connected to those memory device slots). However, while a specific example of a "first boot operation" has been described, one of skill in the art in possession of the present disclosure will recognize that functionality associated with a first boot operation may be performed in other boot operation scenarios (e.g., a subsequent boot operation that configures a memory device in a memory device slot and that occur after a prior boot operation that configured a memory device in that memory device slot) while remaining within the scope of the present disclosure as well. For example, a first boot operation associated with any memory device slot may be any boot operation that results in a memory device in that memory device slot being successfully configured using memory device configuration information stored in the configuration region of the SPD EEPROM of that memory device (e.g., because there is no failure in that configuration region.)

The method 400 then proceeds to decision block 404 where it is determined whether there is a failure in a configuration region of a memory device. In an embodiment, at decision block 402, the memory device management engine 204 may operate to determine whether there is a failure in a configuration region of any of the memory devices 208a-208c. For example, as part of the boot operation of the computing device 200, the memory device management engine 204 may attempt to configure each of the memory devices 208a/300, 208b/300, and 208c/300 by attempting to access memory device configuration information from the configuration regions 306a in the SPD EEPROM subsystem 306 in each of those memory devices 208a-208c/300, and may identify a failure in the configuration region 306a of the SPD EEPROM subsystem 206 in any of those memory devices 208a-208c/300 due to, for example, an inability to access that memory device configuration information. For example, one of skill in the art in possession of the present disclosure will recognize that the configuration region 306a in the SPD EEPROM subsystem 306 must be operable without any memory cell failures in order for the memory device 300 to be properly configured during POST, and that configuration region 306a in the SPD EEPROM subsystem 306 may experience a memory cell failure that can prevent the retrieval of memory device configuration information from the configuration region 306a of the SPD EEPROM subsystem 306. As such, at decision block 404, the memory device management engine 204 may utilize any of a variety of techniques to identify that failure/inability to retrieve memory device configuration that would be apparent to one of skill in the art in possession of the present disclosure.

In a specific example, during a Power On Self Test (POST) that is part of the boot operations, the memory device management engine 204 may check each memory device slot 206a-206c to determine if a memory device is present by, for example, issuing a command to a sideband management interface on each of the memory devices. However, one of skill in the art in possession of the present disclosure will recognize that memory device presence may be determined using a variety of other techniques that will fall within the scope of the present disclosure as well. In the event a memory device 300 is determined to be present in a memory device slot, the memory device management engine 204 may read the configuration region 306a in the SPD EEPROM subsystem 306 of that memory device (e.g., a Base Configuration and DRAM Parameters and Standard Module Parameters section of the SPD EEPROM subsystem 306) and perform a Cyclic Redundancy Check (CRC) operation on a CRC value stored in the configuration region 306a in the SPD EEPROM subsystem 306 of that memory device in order to determine whether there are one or more memory cell failures in the configuration region 306a in the SPD EEPROM subsystem 306.

Similarly, in some embodiments, the memory device management engine 204 may read the manufacturer region 306b in the SPD EEPROM subsystem 306 of that memory device and perform a CRC operation on a CRC value stored in the manufacturer region 306b in the SPD EEPROM subsystem 306 of that memory device in order to determine whether there are one or more memory cell failures in the manufacturer region 306b in the SPD EEPROM subsystem 306, and/or may read the programmable region 306c in the SPD EEPROM subsystem 306 of that memory device and perform a CRC operation on a CRC value stored in the programmable region 306c in the SPD EEPROM subsystem 306 of that memory device in order to determine whether there are one or more memory cell failures in the programmable region 306c in the SPD EEPROM subsystem 306.

If, at decision block 404, it is determined that there is no failure in a configuration region of a memory device, the method 400 proceeds to block 406 where a memory device management engine retrieves memory device configuration information from a memory device in a memory device slot during a first boot operation. In an embodiment, at block

406, the memory device management engine 204 may operate to retrieve memory device configuration information from any memory device coupled to a memory device slot 206a-206c. As such, in a specific example, at block 402 the memory device 208a/300 may be connected to the memory device slot 206a, and the computing device 200 may be initialized such that boot operations begin for the computing device 200. In response to determining there are no failures in a configuration of that memory device 208a/300 at decision block 404, the memory device management engine 204 in the computing device 200 may operate to retrieve memory device configuration information from the configuration region 306a of the SPD EEPROM subsystem 306 in the SPD hub subsystem 304 of that memory device 208a/300 at block 406.

As will be appreciated by one of skill in the art in possession of the present disclosure, a lack of SPD EEPROM memory cell failures in the configuration region 306a of the SPD EEPROM subsystem 306 will allow the memory device management engine 304 to access the configuration region 306a of the SPD EEPROM subsystem 306 and retrieve the memory device configuration information for the memory device 208a/300 that is stored thereon. However, while the retrieval of memory device configuration information from the intact configuration region 306a of the SPD EEPROM subsystem 306 in the memory device 208a/300 is illustrated and described in the examples below, one of skill in the art in possession of the present disclosure will recognize that memory device configuration information may be retrieved from intact configuration regions of SPD EEPROM subsystems in any of the memory device 208b and up to 208c while remaining within the scope of the present disclosure as well.

The method 400 then proceeds to block 408 where the memory device management engine uses the memory device configuration information to configure the memory device. In an embodiment, at block 404, the memory device management engine 204 in the computing device 200 may operate to configure the memory device 208a/300 using the memory device configuration information that was retrieved from the configuration region 306a in the SPE EEPROM subsystem 306 of the memory device 208a/300. One of skill in the art in possession of the present disclosure will recognize that a variety of techniques may be utilized to configure a memory device using memory device configuration information retrieved from the configuration region in the SPE EEPROM subsystem of that memory device, and thus those techniques are not discussed herein in detail. As such, one of skill in the art in possession of the present disclosure will recognize that, during any boot operation for the computing device 200, a lack of a failure in the configuration region 306a of the SPD EEPROM subsystem 306 of any of the memory devices 208a-208c/300 (e.g., no CRC errors as discussed in the examples above) will result in memory device configuration information being retrieved from the configuration region 306a of the SPD EEPROM subsystem 306 in that memory device, and used to configure that memory device for use subsequent to the boot operations and during runtime of the computing device 200.

The method 400 then proceeds to block 410 where the memory device management engine stores the memory device configuration information and memory device component information retrieved from the memory device in a memory device management database. In an embodiment, at block 410, the memory device management engine 204 may operate to copy, store, and/or otherwise provide the memory device configuration information that was retrieved from the configuration region 306a of the SPD EEPROM subsystem 306 in the memory device 208a/300 in the memory device management database 310 in association with the memory device slot 206a to which the memory device 208a is connected. In addition, at block 410, the memory device management engine 204 may also access the manufacturer region 306b of the SPD EEPROM subsystem 306 in the memory device 208a/300, retrieve manufacturer information from the manufacturer region 306b of the SPD EEPROM subsystem 306 in the memory device 208a/300, and store that manufacturer information in the memory device management database 310 in association with the memory device slot 206a to which the memory device 208a is connected.

In a specific example, manufacturer information retrieved from the manufacturer region 306b of the SPD EEPROM subsystem 306 in the memory device 208a/300 and stored in the memory device management database 210 may include manufacturer identifiers such as a memory device supplier identifier that identifies a supplier of the memory device 208a/300, a memory device revision identifier that identifies a revision of the memory device 208a/300, a memory device part identifier that identifies a part (e.g., a part number) of the memory device 208a/300, memory device serial numbers for sideband management devices on the memory device 208a/300 (e.g., serial numbers for the RCD subsystem 308, the power management subsystem 310, the non-volatile media controller subsystem 312, and the temperature subsystem 314), and/or any other manufacturer identifiers that would be apparent to one of skill in the art in possession of the present disclosure. As will be appreciated by one of skill in the art in possession of the present disclosure, information such as serial numbers, device types, manufacturer identifiers for the memory device components may require the memory device management engine 204 read that information directly from those memory device components (i.e., rather than retrieving that information from the manufacturer region 306b of the SPD EEPROM subsystem 306.) Furthermore, the memory device management database 210 may be provided in a variety of locations outside the configuration region 306a of the SPD EEPROM subsystem 306 including, for example, an SPD Read Only Memory (ROM), a BMC non-volatile memory, a host platform non-volatile memory, a life cycle controller non-volatile memory, a Basic Input/Output System (BIOS) memory subsystem, a flash memory device, and/or any other non-volatile memory location included within the computing device 200.

Furthermore, in some embodiments, the memory device management database 210 may be provided in the programmable region 306c of the SPD EEPROM subsystem 306 of the memory device 208a/300 (e.g., in future SPD EEPROM subsystems that include sufficient space for storage of the memory device configuration information and memory device component information, such as Dual Data Rate 5 (DDR5) memory devices that are expected to include a 384-512 byte programmable region 306c in the SPD EEPROM subsystem 306.) Further still, in some embodiments, the memory device management database 210 may be provided in other non-volatile memory locations included in the memory device 208a/300 such as, for example, a non-volatile memory in the power management subsystem 310, a non-volatile memory in the non-volatile media controller subsystem 312, and/or a non-volatile memory in any other subsystem that is accessible via a memory device sideband channel and includes sufficient space to store the memory device configuration information and memory device component information (which is expected to require 512 bytes for Dual Data Rate 4 (DDR4) memory devices, and 1024 bytes for DDR 5 memory devices.) Further still, if a memory device includes additional and/or available non-volatile memory, that non-volatile memory may be utilized to store redundant copies of the memory device component information and memory device configuration information while remaining within the scope of the present disclosure as well. However, while several specific examples have been provided, one of skill in the art in possession of the present disclosure will recognize that the memory device configuration information and memory device component information may be stored in any non-volatile memory location that enables the functionality described below while remaining within the scope of the present disclosure.

The method 400 then proceeds to block 412 where the computing device completes the boot operation. In an embodiment, at block 412, the computing device 200 may complete boot operations such that the memory device 208a/300 is ready for use during runtime of the computing device 200. As such, one of skill in the art in possession of the present disclosure will recognize that, during any boot operation for the computing device 200 and for any memory devices configured using the memory device configuration information retrieved from its configuration region 306a in its SPD EEPROM subsystem 306, that memory device configuration information and memory device component information retrieved from that memory device may be stored in the memory device management database 210. Furthermore, with reference to the example discussed above, following the configuration of a memory device using the memory device configuration information retrieved from its configuration region 306a in its SPD EEPROM subsystem 306, and the storage of that memory device configuration information and memory device component information from that memory device in the memory device management database 210, bits for the respective memory device slot to which those memory devices are connected may be set to "valid" in the memory device management database 210 in order to indicate that memory device configuration information has been copied from the configuration region in the SPD EEPROM subsystem in a memory device that was connected to that memory device slot and that was successfully configured, and stored in the memory device management database 210. Thus, each memory device slot 206a-206c that has been connected to a memory device that was successfully configured using memory device configuration information in the configuration region of its SPD EEPROM subsystem may be associated in the memory device management database 210 with that memory device configuration information and memory device component information for that memory device.

If, at decision block 404, it is determined that there is a failure in a configuration region of a memory device, the method 400 proceeds to block 414 where the memory device management engine retrieves the memory device component information and the memory device configuration information from the memory device management database. In an embodiment, at block 414 and following a determination that there is a failure in the configuration region 306a of the SPD EEPROM subsystem 306 in the memory device 208a/300 (e.g., a CRC error in the example provided above), the memory device management engine 204 may retrieve the memory device component information and the memory device configuration information that is stored in the memory device management database 210 in association with the memory device slot 206a that is connected to that memory device 208a/300.

As discussed above, in some examples, following the configuration of a memory device using the memory device configuration information retrieved from its configuration region 306a in its SPD EEPROM subsystem 306, and the storage of that memory device configuration information and memory device component information from that memory device in the memory device management database 210, bits for the respective memory device slot to which that memory device was connected may be set to "valid" in the memory device management database 210 in order to indicate that memory device configuration information has been copied from the configuration region in the SPD EEPROM subsystem in a memory device in that memory device slot that was successfully configured, and stored in the memory device management database 210. As such, at block 414 and in response to determining that there is a failure in the configuration region 306a of the SPD EEPROM subsystem 306 in the memory device 208a/300, the memory device management engine 204 may identify whether the bits associated with the memory device slot 206a have been set to "valid" and, if so, may retrieve the memory device configuration information and the memory device component information associated with that memory device slot 206a in the memory device management database 210. As will be appreciated by one of skill in the art in possession of the present disclosure, in the event a memory device slot that is associated with memory device configuration information and memory device component information in the memory device management database 210 is determined to not be connected to a memory device during boot operations (e.g., the POST operations discussed above), the bits associated with that memory device slot that were previously set to "valid" may be cleared/set to "invalid".

In some embodiments, at block 414 and in response to determining that there is a failure in the configuration region 306a of the SPD EEPROM subsystem 306 in the memory device 208a/300, the memory device management engine 204 may identify that the bits associated with the memory device slot 206a are set to "invalid" to indicate that no memory device configuration information has been copied from a memory device in that memory device slot and stored in the memory device management database 210. In such situations the memory device cannot be recovered with 100% certainty, but it may still be possible to recover that memory device. For example, in response to determining that there is a failure in the configuration region 306a of the SPD EEPROM subsystem 306 in the memory device 208a/300 and that no memory device configuration information is associated with the memory device slot 206a in the memory device management database 210, at block 414 the memory device management engine may retrieve memory device component information and memory device configuration information from another memory device (e.g., the memory device 208b or 208c), or may retrieve memory device component information and memory device configuration information that is stored in the memory device management database 210 in association with a different memory device slot (e.g., the memory device slots 206b and 206c, rather than the memory device slot 206a that is connected to the memory device 208a/300 with the failed configuration region 306a of its SPD EEPROM subsystem 206.) As will be appreciated by one of skill in the art in possession of the present disclosure, in such situations, the memory device management engine 204 may assume that most memory device configurations are uniform and/or balanced across memory device channels and memory device interleave groups, and thus may attempt to retrieve memory device component information and memory device configuration information from a memory device that is possibly similar to the memory device 208a/300.

The method 400 then proceeds to decision block 416 where it is determined whether memory device components in the memory device correspond to the memory device component information. In an embodiment, at decision block 416, the memory device management engine 204 may operate to determine whether the memory device components on the memory device 208a/300 correspond to the memory device component information retrieved at block 414. In some examples, "correspondence" between memory device components on a memory device and memory device component information may include an exact match between the memory device components on that memory device and memory device components identified by the memory device component information. As discussed below, such "exact match" correspondence allows for the recovery of that memory device with "100% certainty", as the exact match between the memory device components on that memory device and memory device components identified by the memory device component information indicates that the memory device being recovered (i.e., the memory device with the failure in the configuration region of its SPD EEPROM subsystem) is the same memory device (or the same type of memory device) as the memory device from which the memory device configuration information was retrieved and stored in the memory device management database 210 in association with the memory device slot.

However, in some examples, "correspondence" between memory device components on a memory device and memory device component information may include a partial match between the memory device components on that memory device and memory device components identified by the memory device component information. As discussed below, such "partial match" correspondence may provide less than 100% certainty of the recovery of that memory device, as the partial match between the memory device components on that memory device and memory device components identified by the memory device component information indicates that the memory device being recovered (i.e., the memory device with the failure in the configuration region of its SPD EEPROM subsystem) is a different memory device than the memory device from which the memory device configuration information was retrieved and stored in the memory device management database 210 in association with the memory device slot. However, one of skill in the art in possession of the present disclosure will appreciate that less than 100% certainty may still allow for the recovery of a memory device with a failure in its configuration region of its SPD EEPROM subsystem.

In some examples, the determination of whether memory device components in the memory device correspond to the memory device component information may include determining whether the SPD hub subsystem 304 on the memory device 300 matches an SPD hub subsystem manufacturer, an SPD hub subsystem identifier, and/or an SPD hub subsystem revision identified in manufacturer information included in the memory device component information. In some examples, the determination of whether memory device components in the memory device correspond to the memory device component information may include determining whether the RCD subsystem 308 on the memory device 300 matches an RCD subsystem manufacturer, an RCD subsystem identifier, an RCD subsystem revision, and/or an RCD subsystem serial number identified in manufacturer information included in the memory device component information. In some examples, the determination of whether memory device components in the memory device correspond to the memory device component information may include determining whether the power management subsystem 310 on the memory device 300 matches a power management subsystem manufacturer, a power management subsystem identifier, a power management subsystem revision, and/or a power management subsystem firmware revision identified in manufacturer information included in the memory device component information.

In some examples, the determination of whether memory device components in the memory device correspond to the memory device component information may include determining whether the non-volatile media controller subsystem 312 on the memory device 300 matches a non-volatile media controller subsystem manufacturer, a non-volatile media controller subsystem identifier, a non-volatile media controller subsystem revision, and/or a non-volatile media controller subsystem firmware revision identified in manufacturer information included in the memory device component information. In some examples, the determination of whether memory device components in the memory device correspond to the memory device component information may include determining whether the temperature sensor subsystem 314 on the memory device 300 matches a temperature sensor subsystem manufacturer, a temperature sensor subsystem identifier, and/or a temperature sensor subsystem revision identified in manufacturer information included in the memory device component information.

Furthermore, in addition to memory device components, other features of the memory device may be checked against other types of previously stored memory device information (i.e., from the memory device that was connected to the same memory slot and that was most recently successfully configured using memory device configuration information stored in the configuration region of its SPD EEPROM subsystem). For example, memory devices such as DIMMs may support certificates and/or other authentication protocols, and thus that information may be stored similarly to the memory device component information discussed above, and used to determine correspondence=with a memory device having a failed configuration region of its SPD EEPROM subsystem.

As such, in some embodiments, the memory device management engine 204 may attempt to recover memory devices having memory device components with any level, degree, or other measure of correspondence (e.g., 0% to 100% certainty) with the memory device component information retrieved at block 414. However, in other embodiments, the memory device management engine 204 may only attempt to recover memory devices having memory device components with a threshold level, degree, or other measure of correspondence (e.g., 75% certainty) with the memory device component information retrieved at block 414. While a few examples have been described, one of skill in the art in possession of the present disclosure will recognize that the correspondence between a memory device (i.e., its memory device components) and previously saved memory device component information from a memory device that was most recently connected to the same memory device slot and that experienced a successful configuration using the memory device configuration information stored in the configuration region of its SPD EEPROM subsystem, may be determined in a variety of manners that will fall within the scope of the present disclosure as well.

If, at decision block 416, it is determined that memory device components in the memory device do not correspond to the memory device component information, the method 400 proceeds to block 418 where the memory device management engine prevents the memory device from being provided of the memory system. In an embodiment, at block 418, the memory device management engine 204 may determine that the memory device components on the memory device 208a/300 do not correspond to the memory device component information in response determining that the memory device components do not match any of the memory device components identified by the memory device component information, determining that the memory device components do not match some threshold of the memory device components identified by the memory device component information, and/or based on any other correspondence criteria that would be apparent to one of skill in the art in possession of the present disclosure. In response, the memory device management engine 204 may remove the memory device 208a/300 from a memory map, and the method 400 may then proceed to block 420 where the computing device completes the boot operation. In an embodiment, at block 420, the memory device management engine 204 may mark that memory device 208a/300 as unrecoverable, and may instruct the computing device 200 to complete the boot operations such that it enters runtime without use of that memory device 208a/300. One of skill in the art in possession of the present disclosure will recognize that any correspondence threshold (e.g., 100% certainty, 75% certainty, etc.) may be selected for "unrecoverable memory devices" in a computing device 200 based on a variety of factors, and in some situations even no correspondence (e.g., 0% certainty) may not prevent the memory device management engine 204 from attempting to recover a memory device with a failed configuration region in its SPD EEPROM subsystem.

If at decision block 416, it is determined that memory device components in the memory device correspond to the memory device component information, the method 400 proceeds to block 422 where the memory device management engine uses the memory device configuration information to configure the memory device. In an embodiment, at block 422, the memory device management engine 204 may determine that the memory device components on the memory device 208a/300 correspond to the memory device component information in response determining that the memory device components match all of the memory device components identified by the memory device component information, determining that the memory device components match some threshold of the memory device components identified by the memory device component information, and/or based on any other correspondence criteria that would be apparent to one of skill in the art in possession of the present disclosure. In response, the memory device management engine 204 may use the memory device configuration information that was retrieved from the memory device management database 210 at block 414 to configure the memory device 208a/300.

One of skill in the art in possession of the present disclosure will recognize that a variety of techniques may be utilized to configure a memory device using memory device configuration information retrieved from the memory device management database 210 as discussed above, and thus those techniques are not discussed herein in detail. As such, one of skill in the art in possession of the present disclosure will recognize that, during any boot operation for the computing device 200, a failure in the configuration region 306a of the SPD EEPROM subsystem 306 of any of the memory devices 208a-208c/300 (e.g., CRC errors as discussed in the examples above) will result in memory device configuration information being retrieved from the memory device management database 210 based on its association with the memory device slot that is connected to that memory device, and used to configure that memory device for use subsequent to the boot operations and during runtime of the computing device 200.

The method 400 then proceeds to decision block 424 where it is determined whether operation of the memory device is validated. In an embodiment, at decision block 424, the memory device management engine 204 may operate to validate the operation of the memory device 208a/300 by confirming whether the memory device 208a/300 is configured and operating as expected. For example, at decision block 424, the memory device management engine 204 may validate that the memory device 208a/300 responds as expected to the assumed number of ranks, media types (e.g., Dynamic Random Access Memory (DRAM) media types, Storage Class Memory (SCM) media types), etc.), channel speed, capacity, persistence, and/or any other memory device operational characteristics that would be apparent to one of skill in the art in possession of the present disclosure. However, while a few examples have been described, one of skill in the art in possession of the present disclosure will recognize that a memory device may be validated based on any of a variety of factors while remaining within the scope of the present disclosure. If, at decision block 424, it is determined that operation of the memory device is not validated, the method 400 then proceeds substantially as discussed above to block 418 where the memory device management engine prevents the memory device from being provided of the memory system during the second boot operation, and then to block 420 where the computing device completes the boot operation.

However, if at decision block 424, it is determined that operation of the memory device is validated, the method 400 proceeds to block 426 where the memory device management engine identifies the recovery of a memory device with the memory device configuration information in the memory device management database. In an embodiment, at block 426 and in response to configuring the memory device 208a/300 with the memory device configuration information that was previously stored in the memory device management database (in association with the memory device slot 206a to which each were coupled), the memory device management engine 204 may operate to identify the memory device configuration information stored in the memory device management database 210 as associated with a recovered memory device, and in some examples may identify the level of correspondence/certainty associated with that recovery. For example, at block 426, the memory device management engine 204 may set a "recovered" flag in association with the memory device configuration information that was used to configure the memory device 208a/300, and in situations where the memory device 208a/300 was not recovered with 100% certainty, may set a "certainty" flag in association with the memory device configuration information that was used to configure the memory device 208a/300 in order to indicate that the memory device was recovered with less than 100% certainty. As such, in some embodiments, the lack of the setting of the certainty flag may indicate that a memory device that was recovered using memory device configuration information (as indicated by the setting of the recovery flag) was recovered with 100% certainty. The method 400 then proceeds substantially as discussed above to block 420 where the computing device completes the boot operation.

As such, memory devices that are discovered to have failures in the configuration region of their SPD EEPROM subsystem may be recovered using memory device configuration information that was retrieved from the memory device that was most recently successfully configured in the same memory device slot. Furthermore, as discussed above, in the event no memory device configuration information is associated with the memory device slot in which the memory device with the failed configuration region of its SPD EEPROM subsystem is located, or retrieved memory device configuration information for that memory device slot does not provide the correspondence threshold with the memory device components on that memory device, memory device configuration information may be retrieved from other memory devices in other memory device slots, and/or memory device configuration information that was previously stored in the memory device management database 210 in association with a different memory device slot (i.e., a memory device slot other than the one connected to the memory device with the failed configuration region of its SPD EEPROM subsystem) may be retrieved.

Thus, systems and methods have been described that provide for recovery of DIMMs that have experienced a failure in their SPD EEPROM that prevents configuration of those DIMMs. For example, for any DIMM that is connected to a DIMM slot and configured during a boot operation using DIMM configuration information in a configuration region of its SPD EEPROM, DIMM component information that includes details about DIMM components on that DIMM, and that DIMM configuration information, may be saved in a storage subsystem that is separate from the configuration region of their SPD EEPROM. During subsequent boot operations, in the event a DIMM in one of those DIMM slots experiences a failure in the configuration region of its SPD EEPROM, the DIMM component information may be retrieved from that storage subsystem and used to determine whether the DIMM components on that DIMM correspond to DIMM components described in the DIMM component information. In response to determining such a correspondence, the DIMM configuration information may be used to configure that DIMM. As such, a DIMM that is connected to a DIMM slot and that would otherwise be un-configurable due to a failure in the configuration region of its SPD EEPROM may be configured by identifying a similarity between that DIMM and a DIMM that is associated with the most recent successful DIMM configuration and that is located in that DIMM slot, and performing that configuration using the DIMM configuration information saved from the DIMM associated with the most recent successful DIMM configuration in that DIMM slot.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A memory device failure recovery system, comprising:
a first memory device that is connected to a first memory device slot;
a memory device management database; and
a memory device management engine that is coupled to the first memory device via the first memory device slot, and that is coupled to the memory device management database, wherein the memory device management engine is configured to:
identify, during a current boot operation, that the first memory device has experienced a failure in a configuration region of the first memory device;
retrieve, from the memory device management database and during the current boot operation, memory device component information and memory device configuration information that was retrieved as part of a prior boot operation from a memory device that was connected to the first memory device slot;
determine, during the current boot operation, whether first memory device components on the first memory device correspond to the memory device component information, wherein the determining that the first memory device components on the first memory device correspond to the memory device component information during the current boot operation includes:
determining that the first memory device components on the first memory device match a subset of a plurality of memory device components identified by the memory device component information; and
determining that the matching of the first memory device components to the subset of the plurality of memory device components identified by the memory device component information exceeds a correspondence threshold; and
use, during the current boot operation and in response to determining that the first memory device components on the first memory device correspond to the memory device component information, the memory device configuration information to configure the first memory device.

2. The system of claim 1, wherein the memory device management engine is configured to:
validate the operation of the first memory device that was configured using the memory device configuration information during the current boot operation.

3. The system of claim 1, wherein the memory device management engine is configured to:
retrieve, during the prior boot operation from the configuration region of the first memory device that is connected to the first memory device slot, the memory configuration information;
use, during the prior boot operation, the memory device configuration information to configure the first memory device; and
copy, as part of the prior boot operation and in response to configuring the first memory device using the memory device configuration information retrieved from the configuration region of the first memory device, the memory device component information and memory device configuration information to the memory device management database.

4. The system of claim 1, wherein the first memory device components include at least one of a Serial Presence Detect (SPD) hub subsystem, a Register Clock Driver (RCD) subsystem, a power management subsystem, a non-volatile media controller subsystem, and a temperature sensor subsystem.

5. An Information Handling System (IHS), comprising:
a processing system; and a memory system that is coupled to the processing system and that includes instructions that, when executed by the processing system, cause the processing system to provide a memory device management engine that is configured to:

identify, during a current boot operation, that a first memory device connected to a first memory device slot has experienced a failure in a configuration region of the first memory device;

retrieve, from the memory device management database and during the current boot operation, memory device component information and memory device configuration information that was retrieved as part of a prior boot operation from a memory device that was connected to the first memory device slot;

determine, during the current boot operation, whether first memory device components on the first memory device correspond to the memory device component information, wherein the determining that the first memory device components on the first memory device correspond to the memory device component information during the current boot operation includes:

determining that the first memory device components on the first memory device match a subset of a plurality of memory device components identified by the memory device component information; and determining that the matching of the first memory device components to the subset of the plurality of memory device components identified by the memory device component information exceeds a correspondence threshold; and use, during the current boot operation and in response to determining that the first memory device components on the first memory device correspond to the memory device component information, the memory device configuration information to configure the first memory device.

6. The IHS of claim 5, wherein the memory device management engine is configured to:

validate the operation of the first memory device that was configured using the memory device configuration information during the current boot operation.

7. The IHS of claim 5, wherein the memory device management engine is configured to:

retrieve, during the prior boot operation from the configuration region of the first memory device that is connected to the first memory device slot, the memory configuration information;

use, during the prior boot operation, the memory device configuration information to configure the first memory device; and copy, as part of the prior boot operation and in response to configuring the first memory device using the memory device configuration information retrieved from the configuration region of the first memory device, the memory device component information and memory device configuration information to the memory device management database.

8. The IHS of claim 5, wherein the first memory device components include at least one of a Serial Presence Detect (SPD) hub subsystem, a Register Clock Driver (RCD) subsystem, a power management subsystem, a non-volatile media controller subsystem, and a temperature sensor subsystem.

9. The IHS of claim 5, wherein the configuration region of the first memory device is included in a Serial Presence Detect (SPD) Electronically Erasable Programmable Read Only Memory (EEPROM) device.

10. A method for recovering from a failure of a memory device, comprising:

identifying, by a memory device management engine during a current boot operation, that a first memory device connected to a first memory device slot has experienced a failure in a configuration region of the first memory device;

retrieving, by the memory device management engine from the memory device management database and during the current boot operation, memory device component information and memory device configuration information that was retrieved as part of a prior boot operation from a memory device that was connected to the first memory device slot;

determining, by the memory device management engine during the current boot operation, whether first memory device components on the first memory device correspond to the memory device component information, wherein the determining that the first memory device components on the first memory device correspond to the memory device component information during the current boot operation includes:

determining that the first memory device components on the first memory device match a subset of a plurality of memory device components identified by the memory device component information; and determining that the matching of the first memory device components to the subset of the plurality of memory device components identified by the memory device component information exceeds a correspondence threshold; and using, by the memory device management engine during the current boot operation and in response to determining that the first memory device components on the first memory device correspond to the memory device component information, the memory device configuration information to configure the first memory device.

11. The method of claim 10, further comprising:

validating, by the memory device management engine, the operation of the first memory device that was configured using the memory device configuration information during the current boot operation.

12. The method of claim 10, further comprising:

retrieving, by the memory device management engine during the prior boot operation from the configuration region of the first memory device that is connected to the first memory device slot, the memory configuration information;

using, by the memory device management engine during the prior boot operation, the memory device configuration information to configure the first memory device; and copying, by the memory device management engine as part of the prior boot operation and in response to configuring the first memory device using the memory device configuration information retrieved from the configuration region of the first memory device, the memory device component information and memory device configuration information to the memory device management database.

13. The method of claim 10, wherein the first memory device components include at least one of a Serial Presence Detect (SPD) hub subsystem, a Register Clock Driver (RCD) subsystem, a power management subsystem, a non-volatile media controller subsystem, and a temperature sensor subsystem.

14. The method of claim 10, wherein the configuration region of the first memory device is included in a Serial Presence Detect (SPD) Electronically Erasable Programmable Read Only Memory (EEPROM) device.

* * * * *